United States Patent
Peng

(10) Patent No.: US 9,927,926 B2
(45) Date of Patent: Mar. 27, 2018

(54) CAPACITANCE SENSING CIRCUITS, METHODS AND SYSTEMS HAVING GROUND INSERTION ELECTRODES

(75) Inventor: Tao Peng, Nashua, NH (US)

(73) Assignee: Cypress Semiconductor Corporation, San Jose, CA (US)

( * ) Notice: Subject to any disclaimer, the term of this patent is extended or adjusted under 35 U.S.C. 154(b) by 83 days.

(21) Appl. No.: 13/246,467

(22) Filed: Sep. 27, 2011

(65) Prior Publication Data

US 2013/0015868 A1    Jan. 17, 2013

Related U.S. Application Data

(60) Provisional application No. 61/508,323, filed on Jul. 15, 2011.

(51) Int. Cl.
*G06F 3/044* (2006.01)

(52) U.S. Cl.
CPC .................................. *G06F 3/044* (2013.01)

(58) Field of Classification Search
CPC .... G01R 27/26; G01R 27/26; G01R 27/2605; G01R 15/16; G01R 15/06; G01R 23/09; G01R 31/312; G06F 3/044; G01D 5/2405
USPC .......................... 324/176, 650–693; 345/173
See application file for complete search history.

(56) References Cited

U.S. PATENT DOCUMENTS

| | | | |
|---|---|---|---|
| 4,074,184 A * | 2/1978 | Dechene et al. ............... | 324/434 |
| 5,130,661 A * | 7/1992 | Beck et al. .................... | 324/663 |
| 6,370,965 B1 | 4/2002 | Knapp | |
| 7,808,255 B2 | 10/2010 | Hristov et al. | |
| 7,821,274 B2 * | 10/2010 | Philipp et al. ................ | 324/662 |
| 2006/0049834 A1 * | 3/2006 | Umeda .......................... | 324/658 |
| 2007/0008299 A1 * | 1/2007 | Hristov .................. | G06F 3/0416 |
| | | | 345/173 |
| 2007/0062739 A1 * | 3/2007 | Philipp .................... | G06F 3/044 |
| | | | 178/18.06 |
| 2009/0015565 A1 * | 1/2009 | Hong et al. ................... | 345/173 |
| 2009/0135157 A1 | 5/2009 | Harley | |
| 2009/0252386 A1 | 10/2009 | Dean et al. | |
| 2009/0267916 A1 | 10/2009 | Hotelling | |
| 2010/0156439 A1 * | 6/2010 | Schroeder et al. ........... | 324/637 |
| 2010/0182250 A1 | 7/2010 | Kang et al. | |

(Continued)

FOREIGN PATENT DOCUMENTS

| | | |
|---|---|---|
| CN | 101681223 A | 3/2010 |
| EP | 2410409 A | 1/2012 |

(Continued)

OTHER PUBLICATIONS

International Search Report for International Application No. PCT/US2011/053034 mailed Jun. 26, 2012; 3 pages.

(Continued)

*Primary Examiner* — Minh Phan
*Assistant Examiner* — Brent J Andrews

(57) ABSTRACT

A capacitance sensing system can include a plurality of transmit (TX) electrodes disposed in a first direction; a plurality of first electrodes disposed in a second direction and coupled to the TX electrodes by a mutual capacitance, and coupled to a capacitance sense circuit when at least one TX electrode receives a transmit signal; and a plurality of second electrodes structures, interspersed with the first electrodes and coupled to a ground node at least while the one TX electrode receives the transmit signal.

14 Claims, 17 Drawing Sheets

(56) References Cited

U.S. PATENT DOCUMENTS

| | | |
|---|---|---|
| 2010/0182253 A1 | 7/2010 | Park et al. |
| 2010/0220075 A1 | 9/2010 | Kuo et al. |
| 2010/0289503 A1 | 11/2010 | Reynolds et al. |
| 2010/0321034 A1* | 12/2010 | Hargreaves .................. 324/612 |
| 2010/0328255 A1 | 12/2010 | Ishizaki et al. |
| 2011/0006832 A1 | 1/2011 | Land et al. |
| 2011/0155729 A1 | 6/2011 | Hall |

FOREIGN PATENT DOCUMENTS

| | | |
|---|---|---|
| JP | 2005055327 A | 3/2005 |
| WO | 2010062808 A2 | 6/2010 |

OTHER PUBLICATIONS

Written Opinion of the International Searching Authority for International Application No. PCT/US2011/053034 mailed Jun. 26, 2012; 3 pages.
Lee, et al., "A Multi-Touch Three Dimensional Touch-Sensitive Tablet", Computer Systems Research Institute, University of Toronto, Apr. 1985; 5 pages.
SIPO Office Action for International Application No. 201180002761.5 dated Jul. 1, 2016; 3 pages.
SIPO Office Action for International Application No. 201180002761.5 dated Jul. 31, 2015; 6 pages.
SIPO Office Action for Application No. 201180002761.5 dated Mar. 2, 2017; 4 pages.
SIPO Office Action for Application No. 201180002761.5 dated Aug. 21, 2017; 6 pages.

* cited by examiner

CAPACITANCE SENSING CIRCUITS, METHODS AND SYSTEMS HAVING GROUND INSERTION ELECTRODES

This application claims the benefit of U.S. Provisional Patent Application Ser. No. 61/508,323, filed on Jul. 15, 2011, the contents of which are incorporated by reference herein.

TECHNICAL FIELD

The present disclosure relates generally to capacitance sensing systems, and more particularly to sensing electrode arrangements for such systems.

BACKGROUND

FIG. 23 shows a conventional capacitance sensing network 2300 that includes transmit (TX) electrodes 2302-0 to -2 and receive (RX) electrodes 2304-0 to -2 formed below the TX electrodes (2302-0 to -2). In operation, a TX electrode (2302-0 to -2) can be driven by a transmit signal. A mutual conductance between a driven TX electrode and RX electrodes (2304-0 to -2) can be sensed. The presence of an object (e.g., a finger) can result in a change in such a mutual capacitance, which can be sensed as an input event. In some conventional systems, the self-capacitance to ground of some or all electrodes can be sensed.

FIG. 24 shows another conventional capacitance sensing network 2400 that includes TX electrodes 2402-0/1 and RX electrodes 2404-0/1. TX electrodes 2402-0/1 and RX electrodes 2404-0/1 are formed by diamond shaped plates (one shown as 2406). RX electrodes 2404-0/1 are formed by plates being conductively connected to one another in one direction (shown as Y). TX electrodes 2402-0/1 are formed by plates being conductively connected to one another in a perpendicular direction (shown as X) by conductive jumpers (or overpasses) (one shown as 2408). Sensing operations for sensing network 2400 can occur in the manner described for FIG. 23.

FIG. 25 is a schematic diagram showing a sensing model of a conventional device containing a sensing network like that shown in FIG. 23 or 24. FIG. 25 shows capacitance elements that can exist between a TX electrode 2502 and a RX electrode 2504 in a sense operation. Capacitance Cm (Intrinsic) can be a mutual capacitance between TX and RX in the absence of an object, giving rise to a baseline current I_baseline. Capacitance Cm (object, neg value) can be a capacitance change (in this case a negative change) resulting from the proximity of a human body (e.g., finger), giving rise to a sense current component (+I_signal). Capacitance Cs (object) can be a "self" capacitance between a sensed object (e.g., finger) and a device "ground". It is understood that a device ground may not be a true ground potential, and can arise from a device being placed in a non-conductive environment. A capacitance Cf can be a capacitance that exists between the device and a grounded human body when the device ground is decoupled from the human body ground.

As shown, the absence of a significant Cf can give rise to a counter sense current component (-I_signal), which can work against the strength of sense current +I_signal. A sufficiently large counter sense current (-I_signal) can give rise to a non-response (i.e., failure to sense object) or false touch event.

DETAILED DESCRIPTION

Figure 1A:
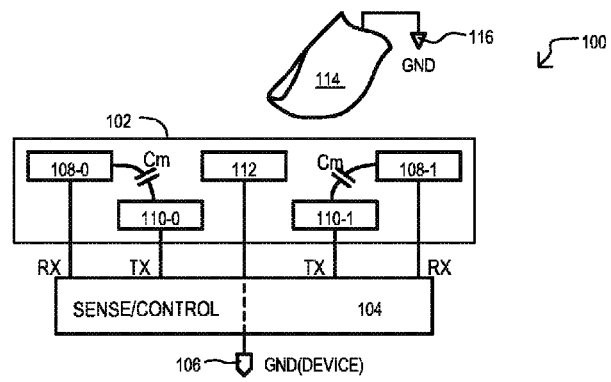
FIGS. 1A and 1B are block schematic diagrams of capacitance sensing systems having ground electrodes according to embodiments.

Various embodiments will now be described that show capacitance sensing systems and methods that provide ground electrodes within a capacitance sensing network that can provide an object (e.g., finger) induced grounding capacitance. Such a grounding capacitance can reduce signal disparity arising from a device ground being decoupled from a user ground.

In the various embodiments shown below, like sections are referred to by the same reference character but with the first digit(s) corresponding to the figure number.

FIG. 1A shows a capacitance sensing system 100 according to a first embodiment in a block schematic diagram. A system 100 can include a sense network 102, a sense control section 104, and a ground node 106. A sense network 102 can include receive (RX) electrodes 108-0/1, transmit (TX) electrodes 110-0/1, and ground electrodes (one shown as 112). A mutual capacitance (Cm) can exist between TX electrodes 110-0/1 and RX electrodes 108-0/1. This mutual capacitance (Cm) can vary (e.g., grow smaller) when a sensed object 114 is proximate the electrode. An object 114 can be grounded (i.e., can be conductively connected to ground 116).

Figure 25:
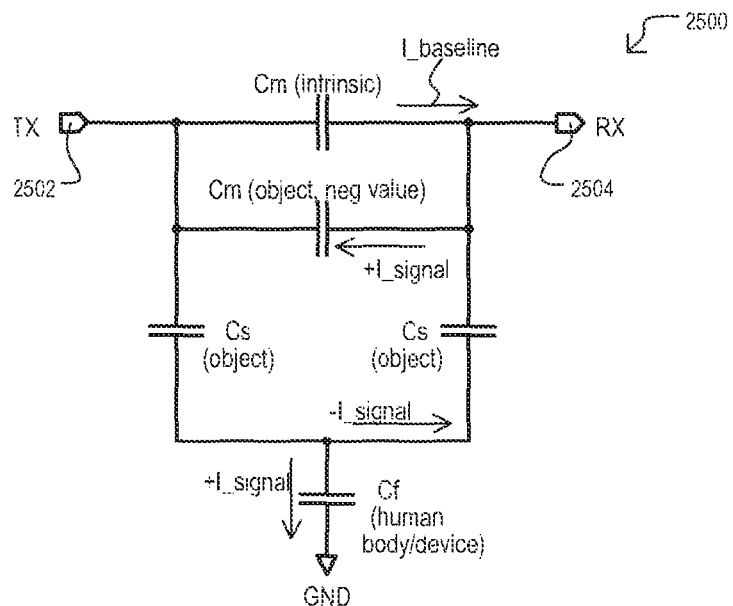
FIG. 25 is a schematic diagram representation of a conventional capacitance sensing system.

In addition, a sense network 102 can include ground electrodes (one shown as 112). Ground electrodes 112 can be connected to ground node 106 during a sensing operation. Further, ground electrodes 112 can be positioned proximate to corresponding RX electrodes 108-0/1 and/or TX electrodes 110-0/1. As a result, when an object 114 is proximate to an RX or TX electrode (108-0/1 or 110-0/1) and the object induces a change in a mutual capacitance (Cm), such an object also induces a capacitance to ground (a grounding capacitance). A grounding capacitance can prevent a counter sense current (−I_signal in FIG. 25) from adversely affecting a capacitance sensing operation in the event a device ground is decoupled from sensing object.

A sense and switching section 104 can sense a mutual capacitance (Cm) between RX and TX electrodes (108-0/1 and 110-0/1). In addition, sense and switching section 104 can provide a conductive connection between ground electrodes 112 and ground node 106. Such a connection may be static or dynamic. In a static connection embodiment, ground electrodes 112 can remain connected to a ground node 106 throughout a sensing operation. In some dynamic connection embodiments, a ground electrode 112 can be connected to a ground node 106 in some sense operation phases, but can then serve as an RX or TX electrode in another sense operation phase.

In yet another embodiment, electrode 112 can be left electrically isolated (i.e., floating) or may be driven by a separate shield signal.

In this way, a capacitance sensing system can include ground electrodes proximate to sensing electrodes that are connected to a ground node during sense operations.

Figure 1B:
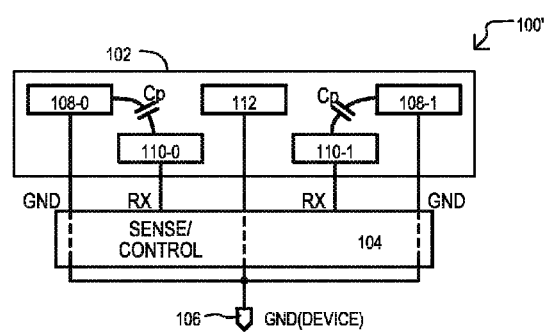

FIG. 1B shows a capacitance sensing system 100' according to another embodiment. FIG. 1B includes sections like that of FIG. 1A. However, unlike FIG. 1A, FIG. 1B shows a system 100' in one particular self-capacitance sensing configuration. In such an arrangement, selected of TX and/or RX electrodes (110-0/1 and/or 108-0/1) can be connected to a ground node 106, while others serve as sense electrodes.

In this way, a capacitance sensing system can include ground electrodes proximate to sensing electrodes that are connected to a ground node during self-capacitance sense operations.

Figure 2:
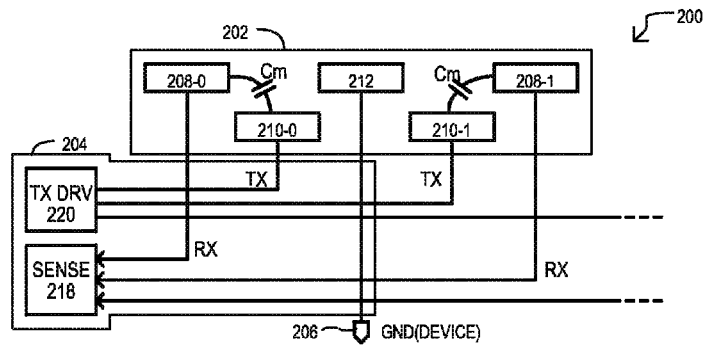
FIG. 2 is a block schematic diagram of a capacitance sensing system having static ground electrodes according to an embodiment.

FIG. 2 shows a capacitance sensing system 200 according to another embodiment in a block schematic diagram. A system 200 can include features like those of FIG. 1A. FIG. 2 shows a system 200 having ground electrodes with a static connection to a ground node.

FIG. 2 differs from FIG. 1A in that a sense control section 204 shows a sense circuit 218 and a signal generator circuit 220. Further, the embodiment of FIG. 2 shows a static ground node connection with ground electrode 212 having a direct connection to ground node 206.

In operation, signal generator 220 can drive one or more selected TX electrodes 210-0/1 with a TX signal. Due to mutual capacitance (Cm), such a signal can induce a sense signal on RX electrodes 208-0/1. Sense circuit 218 can detect any change in capacitance indicating the proximity of a sense object (e.g., finger). While such sense operations are being performed, ground electrode 212 remains connected to ground node 206. Accordingly, the proximity of a grounded sense object (e.g., finger) can induce a grounding capacitance as described above.

In this way, a capacitance sensing system can include ground electrodes proximate to sensing electrodes having static connections to a ground node.

Figure 3:
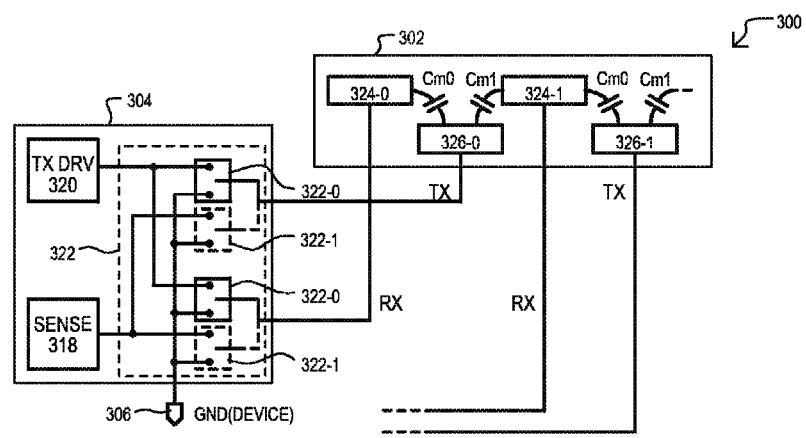
FIG. 3 is a block schematic diagram of a capacitance sensing system having dynamic ground electrodes according to an embodiment.

FIG. 3 shows a capacitance sensing system 300 according to another embodiment in a block schematic diagram. A system 300 can include features like those of FIG. 1B. FIG. 3 shows a system 300 having ground electrodes with a dynamic connection to a ground node.

FIG. 3 differs from FIG. 1B in that a sense network 302 can include dual purpose electrodes 324-0/1 or 326-0/1. Dual purpose electrodes 324-0/1 can serve as RX electrodes in one sensing phase and ground electrodes in another sensing phase.

In addition or alternatively, dual purpose electrodes 326-0/1 can be provided that serve as TX electrodes in one sensing phase, and ground electrodes in another sensing phase. It is understood that in some embodiments, one type of dual purpose electrode can be provided (i.e., some electrodes serve as RX and ground electrodes, while others serve as TX only electrodes, or some electrodes serve as TX and ground electrodes, while others serve as RX only electrodes). However, in other embodiments, both types of dual purpose electrodes can be provided (some electrodes serve as RX and ground electrodes, while others serve as TX and ground electrodes).

In other embodiments, selected of dual purpose electrodes 324-0/1 can be driven by a shield signal or may be left electrically isolated in some phases of a sensing operation.

FIG. 3 also differs from FIG. 1B in that a sense control section 304 shows electrode switches between a sense circuit 318 and a signal generator circuit 320. Electrode switches 322 can selectively connect dual purpose electrodes between a ground node 306 and sensing circuits depending upon a phase of operation. In FIG. 3, electrode switches 322 can include RX switches 322-0 that can connect dual purpose electrodes 324-0 between ground node 306 and sense circuit 318 to enable dual purpose electrodes 324-0 to function as RX electrodes in one phase, and ground electrodes in another. In addition or alternatively, electrode switches 322 can include TX switches 322-1 that can connect dual purpose electrodes 326-1 between ground node 306 and signal generator circuit 320, enabling such electrodes to function as TX electrodes in one phase, and ground electrodes in another phase.

In this way, a capacitance sensing system can include electrodes having dynamic connections to a ground node, enabling such electrodes to be ground electrodes in certain phases, and sensing electrodes (e.g., TX or RX electrodes) in other phases. Further, a system may include elements that enable dynamic connections to other signals, such as a shield signal, or may include elements that can dynamically disconnect certain electrodes during some sensing phases.

Figure 4:
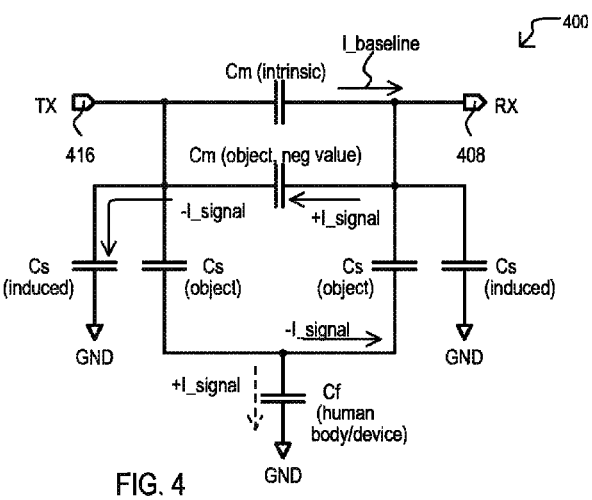
FIG. 4 is a schematic diagram representation of a capacitance sensing system having an object induced capacitance to ground, according to an embodiment.

FIG. 4 is a schematic diagram showing a sensing model of a device containing a sensing network like those shown in embodiments herein. FIG. 4 shows capacitance elements that can exist between a TX electrode 410 and a RX electrode 408 in a sense operation. As in the case of FIG. 25, capacitance Cm (Intrinsic) can be a mutual capacitance between TX and RX in the absence of a object giving rise to a baseline current I_baseline; Cm (object, neg value) can be a capacitance change (in this case a negative change) resulting from the proximity of a human body giving rise to a sense current component (+I_signal); and Cs (object) can be a "self" capacitance between a sensed object and a device "ground" (which can be decupled from a sense object ground). A capacitance Cf can be a capacitance that exists between the device and a grounded sense object (e.g., human body part, such as a finger).

The inclusion of ground electrodes, as described in the embodiments herein, can create an object induced grounding capacitance Cs (induced). Grounding capacitance Cs (induced) can provide a current sink path for all or a significant portion of a counter sense current component (−I_signal). Consequently, a sense signal strength can be improved, as the presence of a current component (−I_signal) on an RX electrode can be reduced, or substantially eliminated.

In this way, an induced grounding capacitance can improve signal disparity caused by a decoupled device ground.

Figure 5:
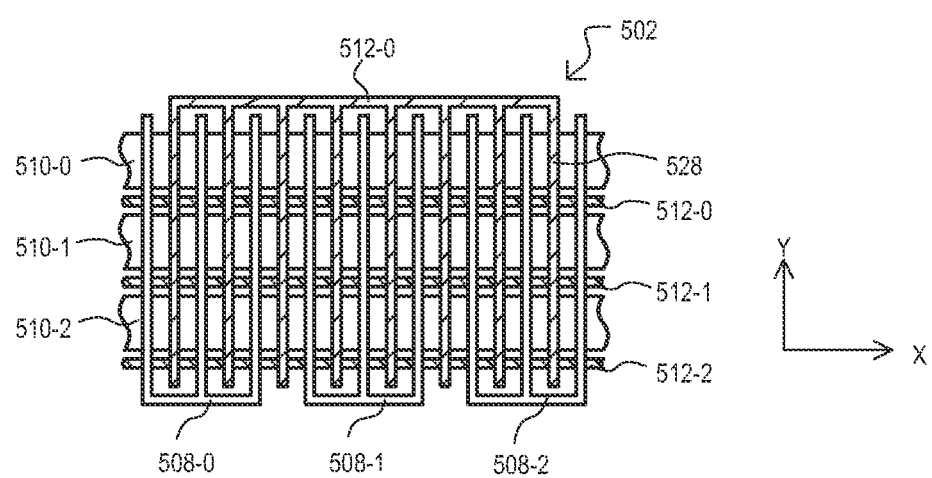
FIG. 5 is a top plan view of a sense network having ground electrodes interspersed with transmit (TX) electrodes and receive (RX) electrodes according to an embodiment.

FIG. 5 shows a sense network 502 according to one embodiment. A sense network 502 can be included in embodiments like that of FIG. 1A/B or 2, and shows electrodes having a static ground connection. FIG. 5 shows a sense network 502 in which TX and RX electrodes can be formed on different surfaces (e.g., different planes).

Sense network 502 can include RX electrodes 508-0 to -2 formed over TX electrodes 510-0 to -2. In addition, sense network 502 can include ground electrode 512-0 having electrode structures (one shown as 528) interspersed between structures of RX electrodes 508-0 to -2. In addition, a sense network 502 can include ground electrodes 512-1 to -3 interspersed between TX electrodes 510-0 to -2. In such an arrangement, the presence of an object that affects a mutual capacitance between RX and TX electrodes can also induce a grounding capacitance as described herein.

In a particular embodiment, electrode structures (e.g. 528) of ground electrode 512-0 can be formed on a same surface as RX electrodes 508-0 to -2. Further, ground electrodes 512-1 to -3 can be formed on a same surface as TX electrodes 510-0 to -2.

Ground electrodes 512-0 to -3 are shown with hatching to delineate them from sensing (e.g., RX and TX) electrodes.

Figure 6A:
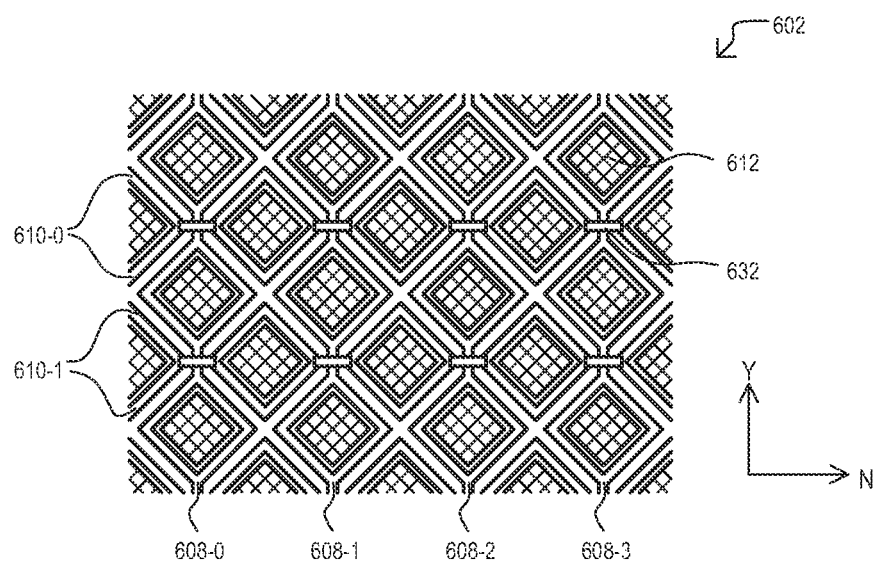
FIGS. 6A and 6B are top plan views of a sense network having ground electrodes interspersed with, and formed within plates of, TX electrodes and RX electrodes, according to an embodiment.
Figure 6B:
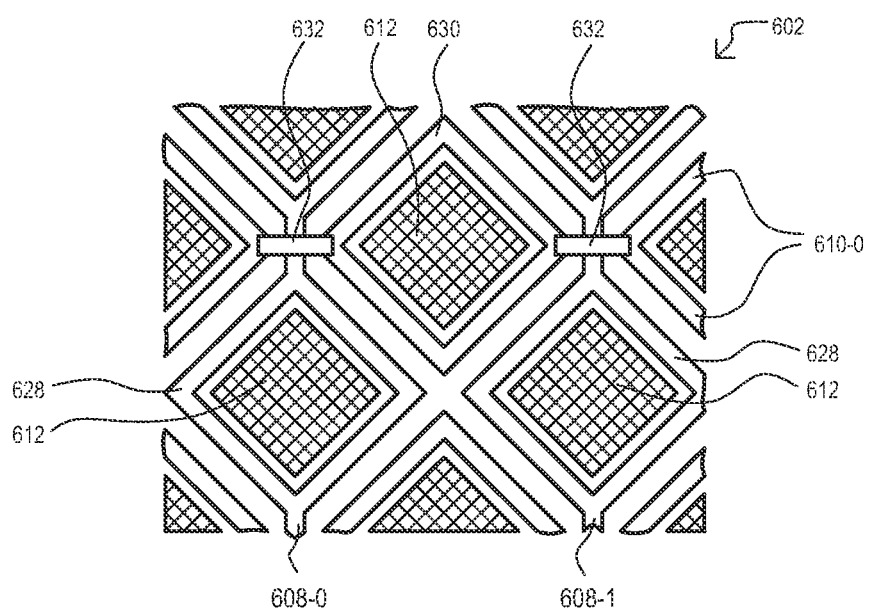

FIG. 6A shows a sense network 602 according to a further embodiment. A sense network 602 can be included in embodiments like that of FIG. 1A/B or 2, and also shows electrodes having a static ground connection. FIG. 6A shows a sense network 602 in which TX and RX electrodes can be substantially formed on a same surface (e.g., are coplanar). FIG. 6B shows a blown up portion of FIG. 6A.

A sense network 602 can have RX and TX electrodes formed by conductive plates connected to one another, with the conductive plates having openings formed therein. Ground electrodes can be formed within the opening of the conductive plates. In the particular embodiment of FIG. 6A, a sense network 602 can include RX electrodes 608-0 to -3, TX electrodes 610-0/1, and ground electrodes (one shown as 612).

As shown in FIG. 6B, RX electrodes (608-0/1) can be formed by RX plates (one shown as 628) having a hollow diamond shape. RX plates (e.g., 628) can be connected with one another in a one direction (shown as Y) at narrowed connections. Ground electrodes 612 can be formed within openings of RX plates 628. In a similar fashion, TX electrodes (610-0) can be formed by TX plates 630, also having a hollow diamond shape. TX plates 630 can be connected with one another in another direction (shown as X) by conductive bridging connections (i.e., "overpass" structures) (one shown as 632). Bridging connections (e.g., 632) can have portions that extend above RX and TX plates (628 and 630) and over narrow portions of RX electrodes. As in the case of RX electrodes, ground electrodes 612 can be formed within openings of TX plates 630.

Ground electrodes 612 are shown with hatching to delineate them from RX and TX electrodes. Ground electrodes 612 can be connected to a ground node by a lower connection (not shown in the figure). In addition or alternatively, ground electrodes 612 can be conductively connected to one another by any other suitable type connection, including an "overpass" structure.

In such an arrangement, a sense object in the proximity of an RX or TX electrode will also be in the proximity of a ground electrode.

Figure 7:
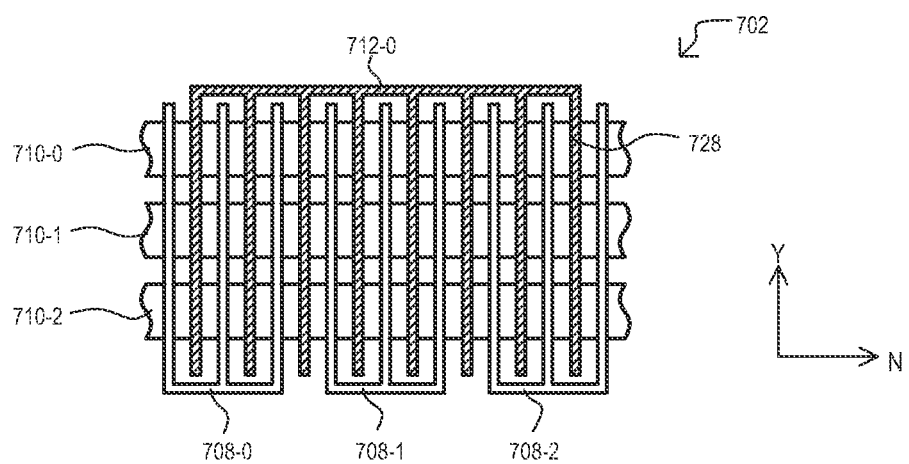
FIG. 7 is a top plan view of a sense network having ground electrodes interspersed with RX electrodes and not TX electrodes according to an embodiment.

FIG. 7 shows a sense network 702 according to a further embodiment. A sense network 702 can have a structure like that of FIG. 5, however, ground electrodes are not interspersed with TX electrodes 710-0 to -2.

Figure 8:
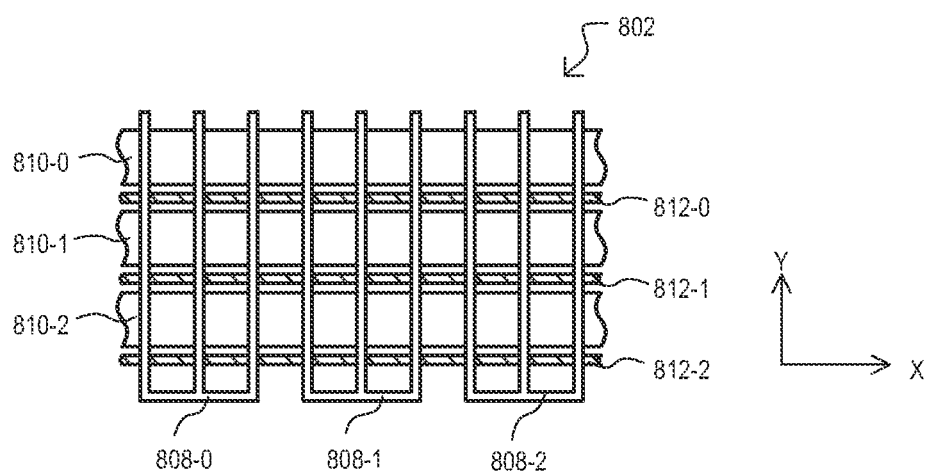
FIG. 8 is a top plan view of a sense network having ground electrodes interspersed with TX electrodes and not RX electrodes according to an embodiment.

FIG. 8 shows a sense network 802 according to another embodiment. A sense network 802 can have a structure like that of FIG. 5, however, ground electrode structures are not interspersed with RX electrodes 808-0 to -2.

Figure 9A:
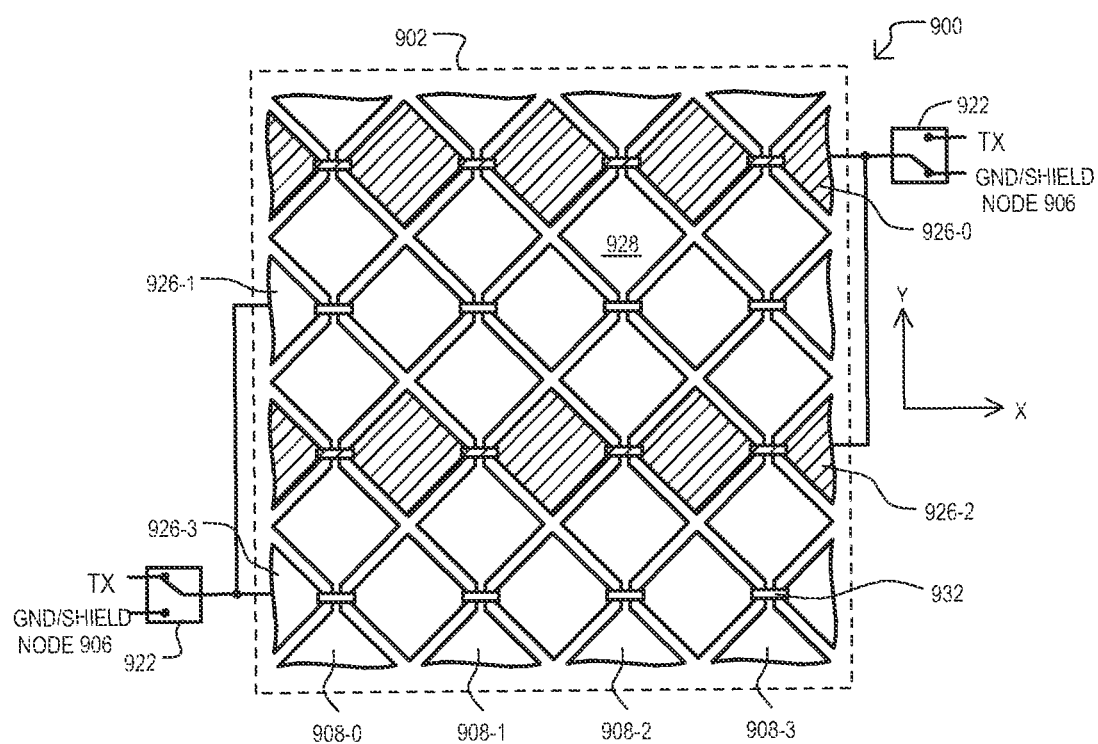
FIGS. 9A and 9B are diagrams of a capacitance sensing system having interleaved dual purpose ground/TX electrodes according to an embodiment.
Figure 9B:
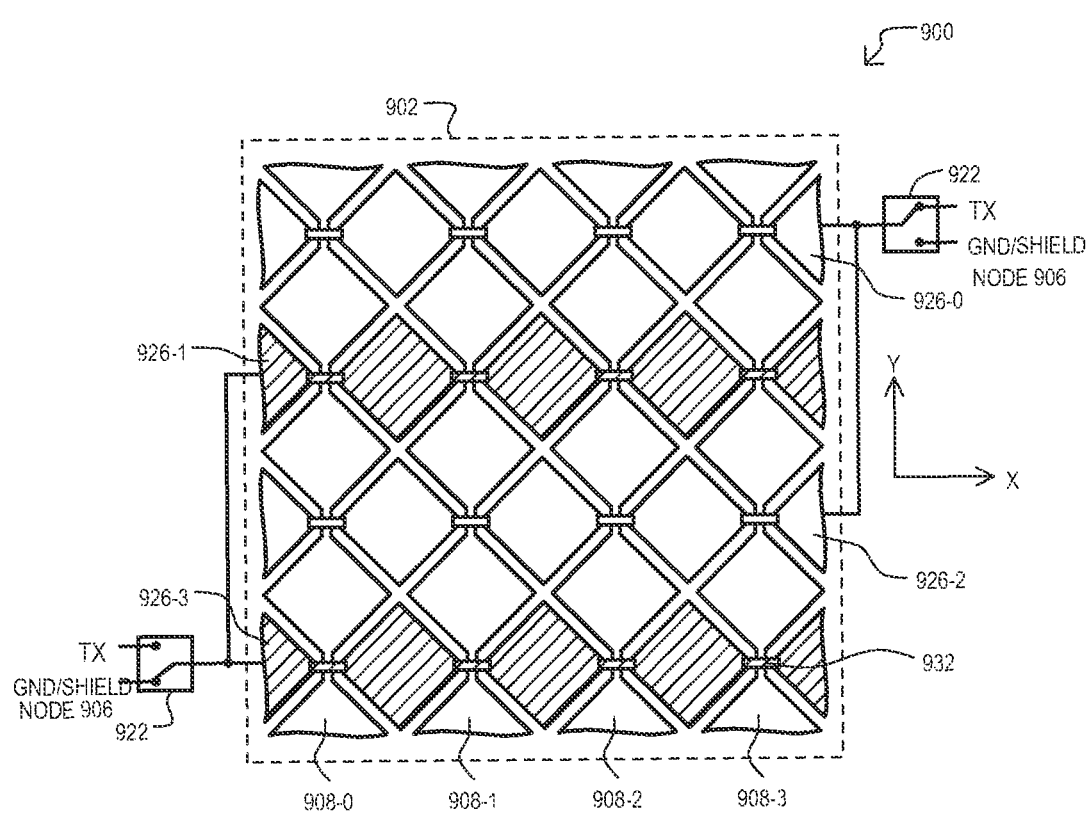

FIGS. 9A and 9B show a capacitance sensing system 900 according to a further embodiment. A system 900 shows a sense network 902 with interleaved electrodes that are dynamically switched between a transmit signal and a ground node.

A sense network 902 can include RX electrodes 908-0 to -3 arranged in a first direction (shown as X). In the particular embodiment shown, RX electrodes (908-0 to -3) can be formed by diamond shaped conductive plates (one shown as 928).

Sense network 902 can also include first dual purpose electrodes 926-0, -2 (even numbered) interleaved with second dual purpose electrodes 926-1, -3 (odd numbered) in a different direction (shown as Y). In the particular embodiment shown, dual purpose electrodes (926-0 to -3) can also be formed by diamond shaped conductive plates. However, plates of each dual purpose \electrode (926-0 to -3) can be conductively connected by overpass structures (one shown as 932).

FIG. 9A shows a first phase of operation. Electrode switches 922 can connect first dual purpose electrodes (926-0, -2) to a ground node and/or a shield node 906, where a shield node can be driven with a shield signal. A shield node can be a node in addition to a ground node. Electrodes connected to the ground node are shown by hatching. At the same time, electrode switches 922 can also connect second dual purpose electrodes (926-1, -3) to a transmit signal (TX).

FIG. 9B shows a second phase of operation. Electrode switches 922 can operate in the opposite fashion to the first phase, connecting first dual purpose electrodes (926-0, -2) to the TX signal, while connecting second dual purpose electrodes (926-1, -3) to ground node 906.

It is understood that in some embodiments, less than all TX electrodes in an interleaved group (as few as one) can be activated at a given time.

The interleaving of first and second dual purpose electrodes (926-1 to -3) can ensure that when a sensed object is in proximity to an RX electrode (908-0 to -3) and/or an activated (i.e., driven with TX signal) dual purpose electrode, the sense object will also be proximate to an electrode connected to a ground node. This can create the object induced capacitance to ground, as described herein.

Figure 10A:
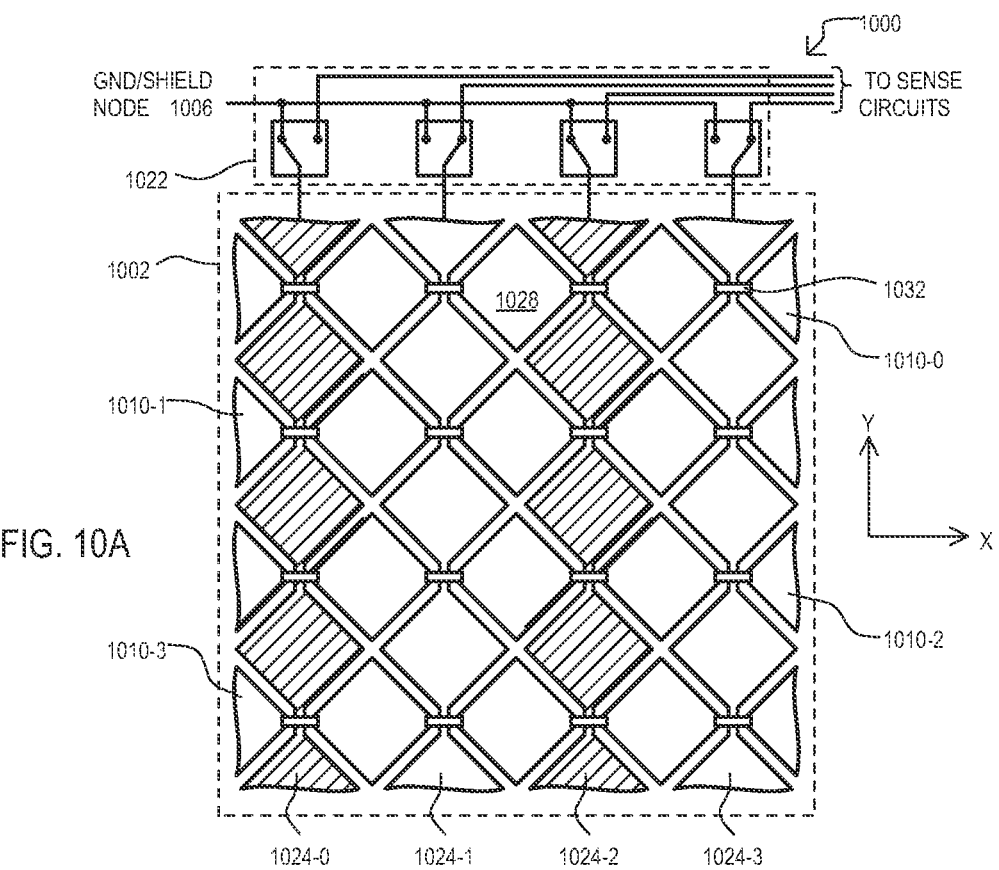
FIGS. 10A and 10B are diagrams of a capacitance sensing system having interleaved dual purpose ground/RX electrodes according to an embodiment.
Figure 10B:
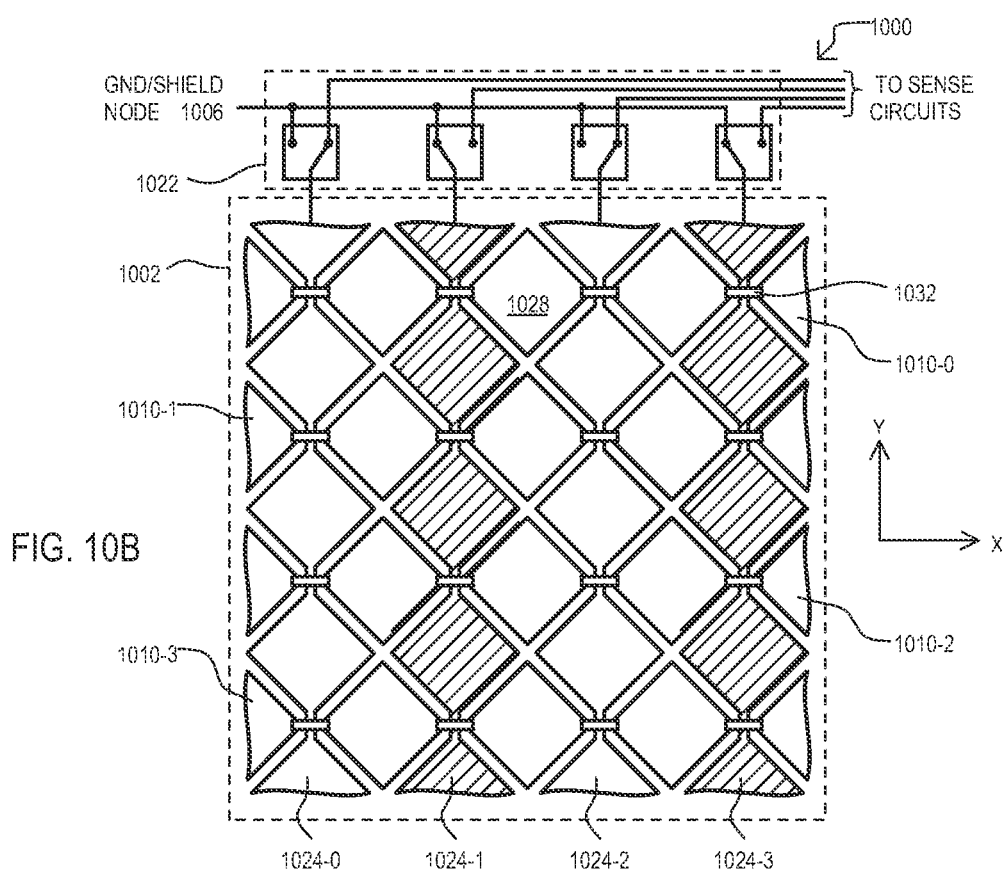

FIGS. 10A and 10B show a capacitance sensing system 1000 according to a further embodiment. A system 1000 shows a sense network 1002 with interleaved electrodes that are dynamically switched between a sense circuit and a ground node.

Sense network 1002 can also include first dual purpose electrodes 1024-0, -2 (even numbered) interleaved with second dual purpose electrodes 1024-1, -3 (odd numbered) in one different direction (shown as X). In the particular embodiment shown, dual purpose electrodes (1024-0 to -3) can have a same or similar structure to RX electrodes (908-0 to -2) shown in FIGS. 9A and 9B.

A sense network 1002 can also include TX electrodes 1010-0 to -3 arranged in another direction (shown as Y). In the particular embodiment shown, TX electrodes (1010-0 to -3) can a same or similar structure to dual purpose electrodes 926-0 to -3 shown in FIGS. 9A and 9B.

FIG. 10A shows a first phase of operation. Electrode switches 1022 can connect first dual purpose electrodes (1024-0, -2) to a ground (or shield) node 1006. Electrodes connected to the ground node are shown by hatching. At the same time, electrode switches 1022 can also connect second dual purpose electrodes (1024-1, -3) to a sense circuit (not shown).

FIG. 10B shows a second phase of operation. Electrode switches 1022 can operate in the opposite fashion to the first phase, connecting first dual purpose electrodes (1024-0, -2) to the sense circuit, while connecting second dual purpose electrodes (1024-1, -3) to ground (or shield) node 1006.

The interleaving of first and second dual purpose electrodes (1024-1 to -3) can help ensure the creation of an object induced capacitance to ground, in the same fashion noted for FIGS. 9A and 9B.

It is understood that an alternate embodiment could combine interleaving techniques shown in FIGS. 9A and 9B with those shown in FIGS. 10A and 10B.

Figure 11:
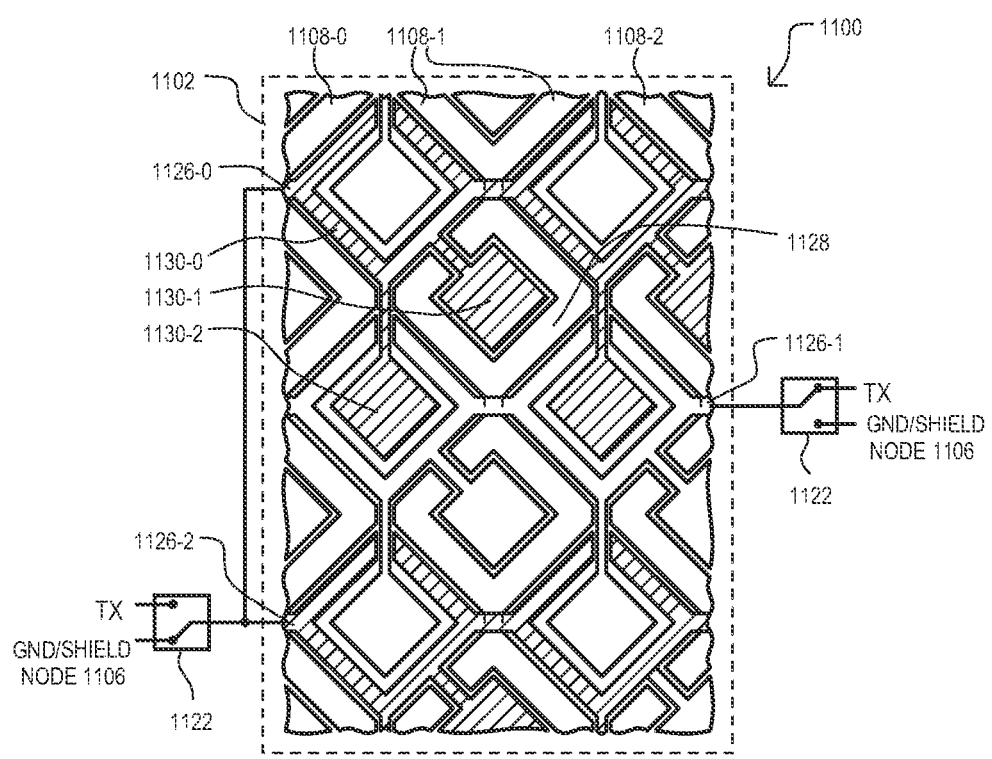
FIG. 11 is a diagram of a capacitance sensing system having interleaved dual purpose ground/TX electrodes with interlocking shapes according to an embodiment.

FIG. 11 shows a capacitance sensing system 1100 according to a further embodiment. Capacitance sensing system 1100 can include a sense network 1102 like that shown in FIGS. 9A and 9B. In FIG. 11, in one phase of operation, first dual purpose electrodes 1126-0, -2 (even numbered) can be connected to a ground (or shield) node 1106 while second dual purpose electrodes 1126-1 (odd numbered) are connected to a transmit signal. In another phase of operation, first and second dual purpose electrodes (1126-0 to -3) can be connected a ground node and TX signal in the opposite fashion.

FIG. 11 differs from FIGS. 9A/B in that dual purpose electrodes (1126-0 to -3) can be can be formed by plates having sections that extend into openings of adjacent electrodes. In the embodiment shown, a plate of each dual purpose electrode can have a section that extends into the opening of an adjacent dual purpose electrode, as well as an opening of an adjacent RX electrode (1108-0 to -2).

In more detail, as shown in FIG. 11, dual purpose electrode 1126-0 can include a plate formed by a first section 1130-0, second section 1130-1 and third section 1130-2. A first section 1130-0 can have a hollow diamond shape that includes an opening in which a plate from an adjacent dual purpose electrode can be positioned. A second section 1130-1 can extend from the first section 1130-0 into an opening of a plate 1128 of an RX electrode 1108-1. A third section 1130-2 can extend from the first section 1130-0 into an opening of a plate of an adjacent dual purpose electrode 1126-1. In the very particular embodiment shown, a first section 1130-0 can have a hollow diamond shape, while second and third sections (1130-1, -2) have solid diamond shapes. Further, plates of RX electrodes (1108-0 to -2) can also have a hollow diamond shape.

In this way, electrodes can have an interlocking pattern. Consequently, when a sense object is in proximity to an active electrode, it is also in proximity to an electrode connected to a ground node.

Figure 12:
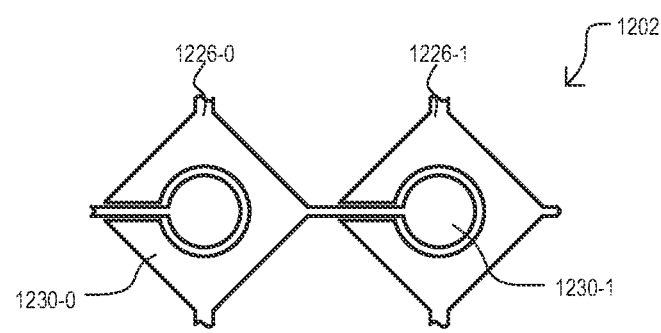
FIG. 12 is a diagram of a capacitance sensing system having interleaved dual purpose ground electrodes with interlocking shapes according to another embodiment.

FIG. 12 shows a sense network 1202 according to another embodiment. Sense network 1202 shows another arrangement with electrodes having an interlocking pattern. Dual purpose electrodes 1226-0/1 can be formed by plates having a first section 1230-0 with an opening to receive a portion of an adjacent electrode, and a second section 1230-1 that extends into an opening of an adjacent electrode. In the particular embodiment shown, an opening within a first section 1230-0 can be circular and a second section 1230-1 can also be circular.

Dual purpose electrodes 1226-0/1 can serve as RX or TX electrodes during particular phases or operation as described herein, or an equivalent.

Figure 13:
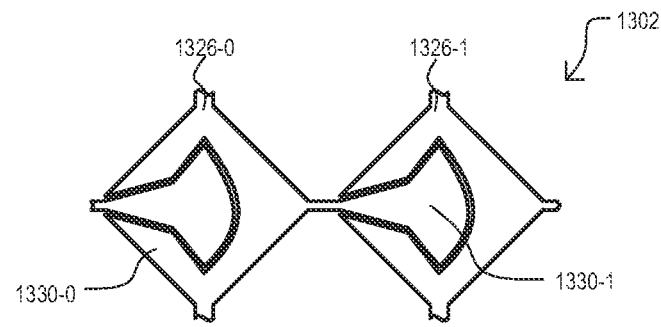
FIG. 13 is a diagram of a capacitance sensing system having interleaved dual purpose ground electrodes with interlocking shapes according to a further embodiment.

FIG. 13 shows a sense network 1302 according to another embodiment. Sense network 1302 shows an arrangement with electrodes having an interlocking pattern like that of FIG. 12. However, electrode plate sections can have a different shape. In the particular embodiment shown, an opening within a first section 1330-0 can have a tapered portion that flares into a wider section. A second section 1330-1 can have shape that follows the shape of the opening within the first section 1330-0.

While FIGS. 11-13 have shown interlocking electrodes having particular shapes, alternate embodiments may have other shapes.

Figure 14:
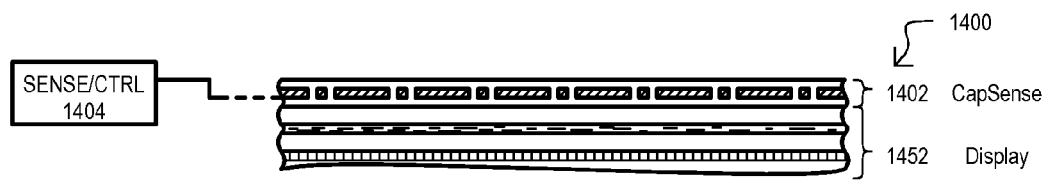
FIG. 14 is a diagram of a capacitance sensing system having a display device according to an embodiment.

FIG. 14 shows a capacitance sensing system 1400 according to another embodiment in a side cross sectional view. System 1400 can be a touch screen system that includes a sense network 1402, a display device 1452, and a sense control section 1404. A sense network 1402 can include transparent electrodes and can be formed over, and physically attached to, the display device 1452. Sense network 1402 can include electrodes that are statically connected to a ground node as described herein, or in an equivalent. In addition or alternatively, a sense and control section 1404 can dynamically switch electrodes between a ground node and an active state (e.g., serving as an RX or TX electrode).

A display device 1452 can include any suitable display device, but in particular embodiments, can include a liquid crystal display (LCD), light emitting diode (LED) display, organic LED (OLED) display, to name but a few.

Figure 15:
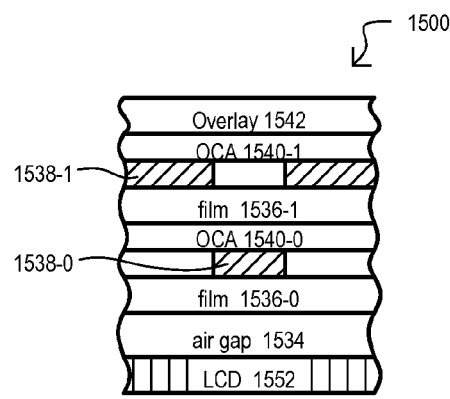
FIGS. 15 to 20 are side cross sectional view of touch screen capacitance sensing systems according to various embodiments.

FIG. 15 shows a touch screen capacitance sensing system 1500 according to another embodiment in a side cross sectional view. A system 1500 can include, in a stacked formation, an LCD 1552, an air gap 1534, a first transparent film 1536-0, a first set of patterned electrodes (one shown 1538-0), a first optically clear adhesive (OCA) layer 1540-0, a second transparent film 1536-1, a second set of patterned electrodes (one shown as 1538-1), a second OCA layer 1540-1, and a protective overlay 1542.

In one embodiment, a first set of electrodes (e.g., 1538-0) can include ground electrodes interspersed with TX electrodes, while a second set of electrodes (e.g., 1538-1) can include ground electrodes interspersed with RX electrodes. In a particular embodiment, a system 1500 can include an electrode structure like that of FIG. 5.

In another embodiment, a first set of electrodes (e.g., 1538-0) can include TX electrodes and not include interspersed ground electrodes, while a second set of electrodes (e.g., 1538-1) can include ground electrodes interspersed with RX electrodes. Alternatively, a first set of electrodes (e.g., 1538-0) can include ground electrodes interspersed with TX electrodes, while a second set of electrodes (e.g., 1538-1) can include RX electrodes and not include interspersed ground electrodes. In a particular embodiment, a system 1500 can include electrode structures like that of FIG. 7 or 8.

In addition or alternatively, selected electrodes of the first and/or second sets (1538-0 and/or 1538-1) can be dual purpose electrodes that can be connected to a ground node in one phase of operation, and serve as active electrodes in another phase of operation.

Figure 16:
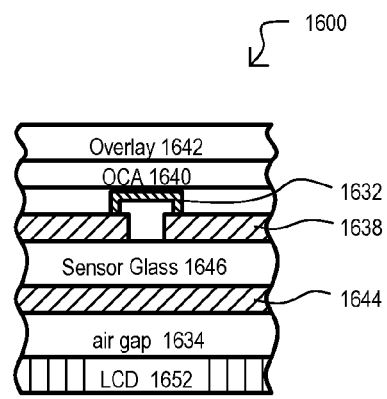

FIG. 16 shows a touch screen capacitance sensing system 1600 according to a further embodiment in a side cross sectional view. A system 1600 can include, in a stacked formation, an LCD display 1652, an air gap 1634, a shielding layer 1644 formed on one surface of a sensor glass 1646, electrodes (one shown as 1638) formed on another surface of sensor glass 1646, an OCA layer 1640, and a protective overlay 1642. Electrodes 1638 can include overpass structures 1632 that conductively connect plates of an electrode to one another.

In one embodiment, selected of electrodes (e.g., 1638) can be ground electrodes interspersed with TX and RX electrodes. In a particular embodiment, a system 1600 can include an electrode structure like that of FIGS. 6A/B.

In addition of alternatively, selected of electrodes (e.g., 1638) can be dual purpose electrodes that can be connected to a ground node in one phase of operation, and serve as active electrodes in another phase of operation. In particular embodiments, a system 1600 can include electrode structures like any of those shown in FIGS. 9A/B, 10A/B and 11-13.

Figure 17:
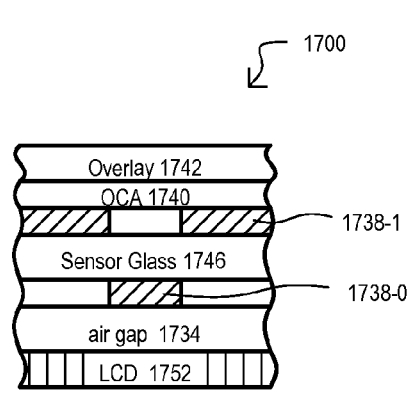

FIG. 17 shows a touch screen capacitance sensing system 1700 according to a further embodiment in a side cross sectional view. A system 1700 can include, in a stacked formation, an LCD 1752, an air gap 1734, a first set of patterned electrodes (one shown 1738-0) formed on one surface of sensor glass 1746, a second set of patterned electrodes (one shown as 1738-1) can be formed on another surface of sensor glass 1746, an OCA layer 1740, and a protective overlay 1742.

As in the case of FIG. 15, in one embodiment, interspersed ground electrodes can be included within first set of electrodes (e.g., 1738-0) and/or second set of electrodes (e.g., 1738-1). In addition or alternatively, first set of electrodes (e.g., 1738-0) and/or a second set of electrodes (e.g., 1738-1) can be dual purpose electrodes that can be connected to a ground node in one phase of operation, and serve as active electrodes in another phase of operation.

Figure 18:
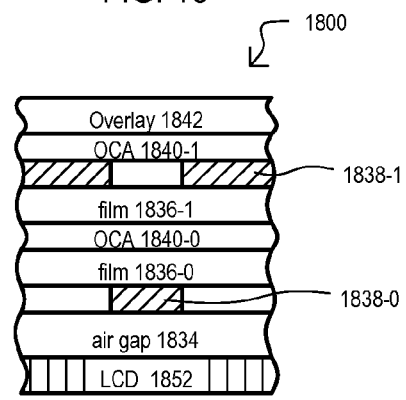

FIG. 18 shows a touch screen capacitance sensing system 1800 according to still another embodiment in a side cross sectional view. A system 1800 can include, in a stacked formation, an LCD 1852, an air gap 1834, a first set of patterned electrodes (one shown 1838-0), a first transparent film 1836-0, a first OCA layer 1840-0, a second transparent film 1836-1, a second set of patterned electrodes (one shown 1838-1), a second OCA layer 1840-1, and a protective overlay 1842.

As in the case of FIG. 15, in one embodiment, interspersed ground electrodes can be included within first set of electrodes (e.g., 1838-0) and/or second set of electrodes (e.g., 1838-1). In addition or alternatively, a first set of electrodes (e.g., 1838-0) and/or a second set of electrodes (e.g., 1838-1) can be dual purpose electrodes that can be connected to a ground node in one phase of operation, and serve as active electrodes in another phase of operation.

Figure 19:
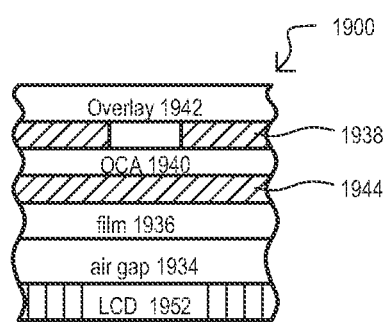

FIG. 19 shows a touch screen capacitance sensing system 1900 according to an embodiment in a side cross sectional view. A system 1900 can include, in a stacked formation, an LCD display 1952, an air gap 1934, transparent film 1936, a shielding layer 1944, an OCA layer 1940, patterned electrodes (one shown as 1938), and a protective overlay 1942.

As the case of FIG. 16, in one embodiment, selected of electrodes (e.g., 1938) can be ground electrodes interspersed with TX and/or RX electrodes. In addition or alternatively, electrodes (e.g., 1938) can include dual purpose electrodes that can be connected to a ground node in one phase of operation, and serve as active electrodes in another phase of operation.

Figure 20:
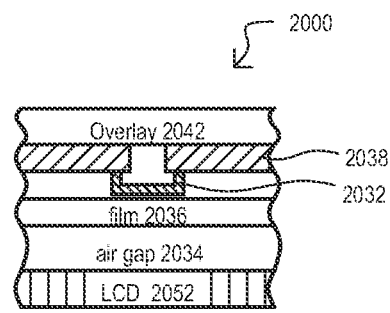

FIG. 20 shows a touch screen capacitance sensing system 2000 according to another embodiment in a side cross sectional view. A system 2000 can include, in a stacked formation, an LCD display 2052, an air gap 2034, a transparent film 2036, electrodes (one shown as 2038), and a protective overlay 2042. Electrodes 2038 can include overpass structures 2032 that conductively connect plates of an electrode to one another.

Selected of electrodes (e.g., 2038) can be ground electrodes interspersed with TX and/or RX electrodes. In addition or alternatively, electrodes (e.g., 2038) can include dual purpose electrodes that can be connected to a ground node in one phase of operation, and serve as active electrodes in another phase of operation.

Embodiments above have shown devices, systems and methods according to various embodiments. Additional methods will now be described with reference to flow diagrams.

Figure 21:
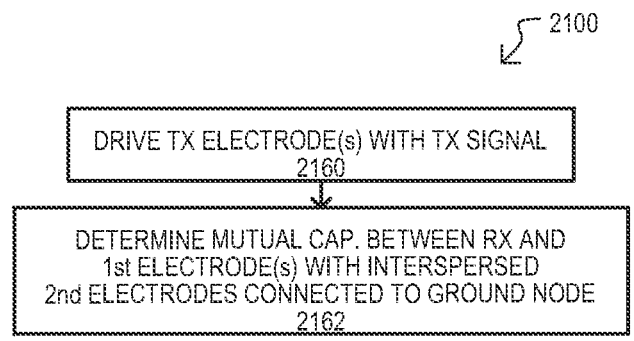
FIG. 21 is a flow diagram of a method according to an embodiment.

FIG. 21 shows a method 2100 according to one embodiment that can include driving TX electrode(s) with a transmit signal (2160). Such an action can include driving one or more TX electrodes with a periodic signal. A method 2100 determines a mutual capacitance between driven TX electrode(s) and first electrodes, where second electrodes are interspersed with the first electrodes and also connected to a ground node (2162). Such an action can include measuring a signal induced by the TX signal on first electrodes. Further, such an action can include maintaining a static or dynamic connection between a ground node and the second electrodes.

Second electrodes can be interspersed with first electrodes to ensure that when a change in mutual capacitance is caused by the proximity of sensed object, the same object induces a capacitance to ground with the second electrodes.

Figure 22:
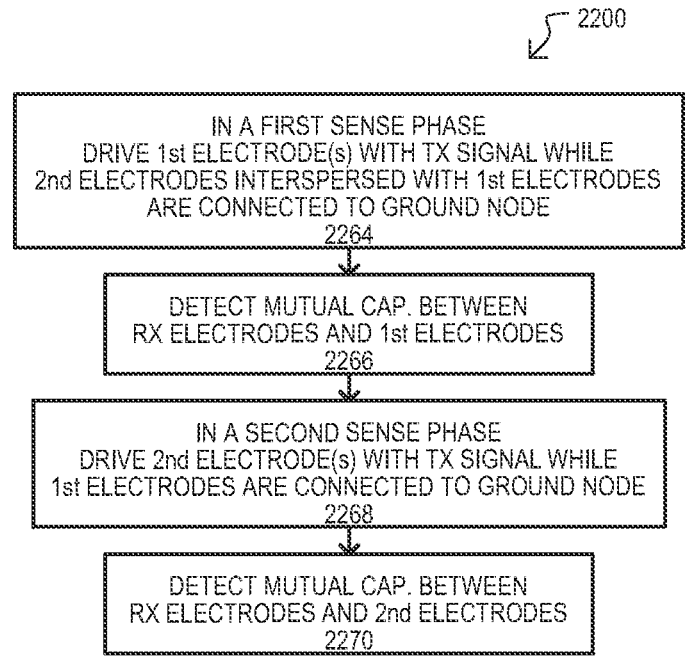
FIG. 22 is a flow diagram of a method according to another embodiment.
Figure 23:
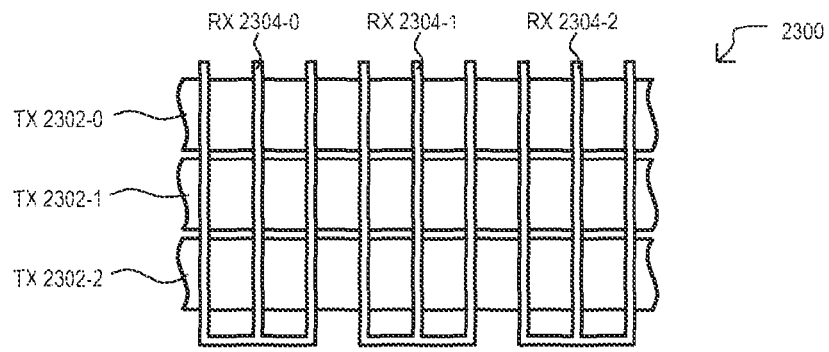
FIG. 23 is a top plan view of a conventional sense network.
Figure 24:
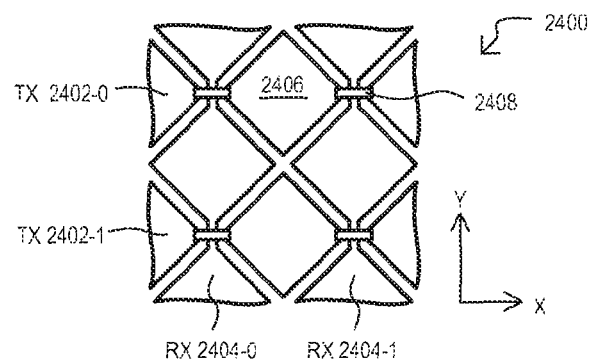
FIG. 24 is a top plan view of another conventional sense network.

FIG. 22 shows a method 2200 according to another embodiment. A method 2200 can include at least two phases of a sense operation. In a first sense phase, one or more first electrode(s) can be driven with a transmit signal while second electrodes, which are interspersed with the first electrodes, are connected to a ground node (2264). A mutual capacitance between the RX electrodes and driven first electrode(s) can be sensed (2266).

In a second sense phase, one or more second electrode(s) can be driven with a transmit signal while first electrodes are connected to a ground node (2268). A mutual capacitance between the RX electrodes and driven second electrode(s) can be sensed (2270).

Embodiments can be utilized in capacitance sense systems to improve an object sense signal for devices that can have their grounds decoupled from the ground of a sensing object (e.g., human body). Inclusion of ground connected electrodes can ensure adverse current signals, arising from a decouple ground state, have a discharge path through a ground capacitance induced by a grounded, sense object (e.g., finger).

In very particular embodiments, a diamond type pattern, like that shown in FIGS. 6A/B and a bar and stripe type pattern like that of FIG. 5 can have a pitch of about 4.5 to 5 millimeters, a resistance can be about 4-7 kohms and a capacitance about 30 pF on a four inch panel.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A capacitance sensing system, comprising:
a plurality of transmit (TX) electrodes disposed in a first direction, wherein:
at least one of the plurality of TX electrodes is coupled to a TX node and at least one other of the plurality of TX electrodes is coupled to a ground node in a first mode,
the at least one other of the plurality of TX electrodes is coupled to the TX node and the at least one of the plurality of TX electrodes is coupled to the ground node in a second mode, and
the TX electrodes are coupled to the TX node or the ground node through a switch;
a plurality of first electrodes disposed in a second direction and coupled to the TX electrodes by a mutual capacitance, and coupled to a capacitance sense circuit when at least one TX electrode receives a transmit signal from the TX node in the first mode, wherein each of the first electrodes comprises a plurality of sensing plates electrically connected to one another, wherein all of the sensing plates of the plurality of first electrodes are formed on one flat coplanar surface; and
a plurality of second electrode structures, interspersed with the first electrodes and coupled to a ground node at least while the one TX electrode receives the transmit signal.

2. The capacitance sensing system claim 1, further including:
a further plurality of electrode switches that selectively couple the second electrode structures or first electrodes to a shield signal.

3. The capacitance sensing system claim 1, wherein:
the first electrodes and second electrode structures alternate with one another in the second direction.

4. The capacitance sensing system claim 3, wherein:
at least one sensing plate of the first electrodes includes an opening formed therein; and
the second electrode structures are formed within the openings of the first electrode sensing plates.

5. The capacitance sensing system claim 1, wherein:
the TX and the first electrodes each comprise a plurality of sensing plates formed on a flat surface and electrically connected to one another by narrow sections, including bridging connections that extend over the flat surface and non-bridging connections formed on the flat surface.

6. The capacitance sensing system claim 1, further including:
a display device physically coupled to the TX electrodes, first electrodes and second electrode structures, and configured to transmit images through the TX electrodes, first electrodes, and second electrode structures.

7. A method, comprising:
driving at least a first transmit (TX) electrode with a transmit signal by coupling the first TX electrode to a TX node and coupling a second TX electrode to a ground node in a first mode;
driving the second TX electrode with the transmit signal by coupling the second TX electrode to the TX node and coupling the first TX electrode to the ground node in a second mode, wherein the TX electrodes are coupled to the TX node or the ground node through a switch;
detecting a mutual capacitance between a plurality of receive (RX) electrodes and the first TX electrode, wherein each of the plurality of RX electrodes comprises a plurality of sensing plates electrically connected to one another, all of the sensing plates formed on one coplanar, flat surface; and
maintaining a connection between a plurality of second electrode structures and a ground node at least while the first TX electrode is driven with the transmit signal from the TX node in the first mode, the plurality of second electrode structures interspersed with the RX electrodes.

8. The method of claim 7, wherein
at least one of the plurality of second electrode structure structures is formed between each adjacent first electrode of the plurality of first electrodes.

9. The method of claim 7, further including:
displaying an image through the TX electrodes, first electrodes, and second electrode structures with a display device.

10. A capacitance sensing system, comprising:
a plurality of conductive plates joined to one another by narrow sections to form a plurality of transmit (TX) and a plurality of receive (RX) electrodes, wherein:
all of the conductive plates are formed on one flat coplanar surface, and
the conductive plates of at least the TX electrodes each include a first section having an opening formed therein, and a second section that extends into the opening of a first section of an adjacent TX electrode; and a plurality of switch circuits that selectively connect at least some of the RX or TX electrodes to a ground node while a first TX electrode is coupled to a TX signal and the plurality of RX electrodes are coupled to a capacitance sense circuit, wherein the first TX electrode is coupled to a TX node through a first switch circuit to provide the TX signal to the first TX electrode and a second TX electrode is coupled to a ground node through a second switch in a first mode, and wherein the first TX electrode is coupled to the ground node through the first switch and the second TX electrode is coupled to the TX node through the second switch to provide the TX signal to the second TX electrode in a second mode.

11. The capacitance sensing system of claim 10, wherein: the switch circuits further selectively connect at least some of the TX or RX electrodes to a shield signal.

12. The capacitance sensing system of claim 1 further comprising:
a plurality of electrode switches that selectively couple the first electrodes and second electrode structures between the ground node and the capacitance sense circuit, and selectively electrically isolate the second electrode structures or the first electrodes.

13. The method of claim 7 further comprising:
in at least a second sensing phase,
  driving the at least one transmit (TX) electrode with the transmit signal;
  detecting a mutual capacitance between second electrode structures and the at least one TX electrode; and
  maintaining a connection between the first electrodes and the ground node at least while the one TX electrode is driven with the transmit signal.

14. The capacitance sensing system of claim 10, wherein:
the TX electrodes include alternating first and second TX electrodes; and
the switch circuits connect the first TX electrodes to the ground node while the second TX electrodes are driven with the TX signal, and connect the second TX electrodes to the ground node while the first TX electrodes are driven with the TX signal, and
the switch circuits are further configured to selectively electrically isolate at least some of the TX or RX electrodes.

* * * * *